US006796366B2

(12) United States Patent
Roche et al.

(10) Patent No.: US 6,796,366 B2
(45) Date of Patent: Sep. 28, 2004

(54) METHOD FOR PRODUCING A FREEZE-CAST SUBSTRATE

(75) Inventors: Allen Dennis Roche, Saline, MI (US); John Michael Nicholson, Wayne, MI (US); Richard L. Allor, Livonia, MI (US); Samir Samir, Inkster, MI (US)

(73) Assignee: Ford Motor Company, Dearborn, MI (US)

( * ) Notice: Subject to any disclaimer, the term of this patent is extended or adjusted under 35 U.S.C. 154(b) by 31 days.

(21) Appl. No.: 10/065,557

(22) Filed: Oct. 30, 2002

(65) Prior Publication Data

US 2004/0084169 A1 May 6, 2004

(51) Int. Cl.[7] .................................................. B22C 9/04
(52) U.S. Cl. ..................... 164/516; 164/519; 264/135
(58) Field of Search ............................... 164/516, 519, 164/45, 46; 264/135, 219, 224, 225

(56) References Cited

U.S. PATENT DOCUMENTS

| 2,728,134 A | * | 12/1955 | Sofield et al. ................ 164/24 |
| 2,875,485 A | * | 3/1959 | Schneider .................... 164/24 |
| 5,368,086 A | * | 11/1994 | Kloskowski ................. 164/33 |
| 5,658,506 A | | 8/1997 | White et al. |
| 6,155,330 A | | 12/2000 | Kinane et al. |
| 6,257,309 B1 | | 7/2001 | Kinane et al. |
| 6,450,243 B1 | * | 9/2002 | Shaw et al. ................. 164/519 |
| 2002/0109249 A1 | | 8/2002 | Klug et al. |

FOREIGN PATENT DOCUMENTS

| GB | 2 119 300 A | 11/1983 |
| WO | WO 97/01407 | 1/1997 |

OTHER PUBLICATIONS

European Patent Office, International Search Report dated Feb. 12, 2003.

* cited by examiner

Primary Examiner—Tom Dunn
Assistant Examiner—Len Tran
(74) Attorney, Agent, or Firm—Brooks Kushman P.C.; Damian Porcari

(57) ABSTRACT

One method of the present invention includes introducing a slurry into a mold unit comprised of a mold contained within a casting receptacle and lowering the temperature of the slurry to freeze the slurry and form a freeze-cast substrate while controlling temperature gradients within the mold unit to minimize distortion in the freeze-cast substrate. Another method includes introducing a slurry into a mold unit comprised of a mold contained within a casting receptacle, placing insulation material around at least a portion of the casting receptacle to minimize distortion in the freeze-cast substrate by controlling temperature gradients within the mold unit, and lowering the temperature of the slurry to freeze the slurry to form a freeze-cast substrate.

19 Claims, 2 Drawing Sheets

METHOD FOR PRODUCING A FREEZE-CAST SUBSTRATE

BACKGROUND OF INVENTION

1. Field of the Invention

At least one aspect of this invention relates generally to producing a freeze-cast substrate and, more specifically, to methods for producing a freeze-cast substrate with minimal distortion.

2. Background Art

Spray forming techniques for producing steel prototype tooling, such as dies or molds, are commonly utilized to make steel tooling. The typical spray forming technique includes the following steps: (1) casting a ceramic substrate containing a spraying pattern about a mold containing a master pattern of the tool to be produced; (2) spraying metallic particles onto the ceramic substrate containing the spraying pattern; (3) allowing the sprayed metallic particles to form a metal deposit having the general shape of the master pattern; and (4) separating the metal deposit from the ceramic substrate.

The casting step is commonly accomplished through a freeze-casting process. One typical freeze-casting process includes the following steps: (1) pouring a slurry into the mold containing the master pattern, (2) lowering the temperature of the slurry to freeze the slurry and form a freeze-cast substrate containing the spraying pattern, (3) extracting the freeze-cast substrate from the mold, (4) thawing the freeze-cast substrate, and (5) drying the freeze-cast substrate during the firing cycle.

While the above method of freeze-casting produces acceptable freeze-cast substrates, the method may produce warping and/or distortion in the spraying pattern. Consequently, the metal deposit may not accurately reflect the master pattern. In extreme cases, the warping and/or distortion may be so pronounced that the metal deposit is rendered unusable as a steel prototype tool. Accordingly, it is an object of the present invention to provide methods of producing a freeze-cast substrate that minimize the amount of distortion the freeze-cast substrate.

SUMMARY OF INVENTION

At least one aspect of the present invention is related to methods for producing a freeze-cast substrate.

One preferred method embodiment includes introducing a slurry into a mold unit and lowering the temperature of the slurry to freeze the slurry and form a freeze-cast substrate while controlling temperature gradients within the mold unit to minimize distortion in the freeze-cast substrate. The mold unit is comprised of a mold contained within a casting receptacle.

Insulating material can be placed around at least a portion of the casting receptacle to control temperature gradients within the mold unit. The rate at which the temperature is lowered can be controlled to minimize temperature gradients in the mold unit over time. Alternatively, the lowering step can include abruptly decreasing the temperature of the mold unit from room temperature to a sub-chilling temperature.

A chilling apparatus, i.e a freezer, can be provided for the lowering step. The chilling apparatus can include a temperature controller for adjusting the temperature within the chilling apparatus.

Once the freeze-cast substrate is formed, metallic particles can be sprayed onto the spraying pattern of the freeze-cast substrate using a spray forming technique. Examples of suitable spray forming techniques include, but are not limited to, cold spraying, flame powder, flame wire, arc spraying, plasma spraying, high energy plasma spraying, vacuum plasma spraying, detonation, and high velocity oxyfuel.

Another preferred method embodiment includes introducing a slurry into a mold unit comprised of a mold contained within a casting receptacle, placing insulation around at least a portion of the casting receptacle to minimize distortion in the freeze-cast substrate by controlling temperature gradients within the mold unit and lowering the temperature of the slurry to freeze the slurry to form a freeze-cast substrate.

In accord with another preferred embodiment, a mold unit for producing a freeze-cast substrate is disclosed which comprises a mold, a substrate receptacle having a base panel having a receiving surface for receiving the mold and side panels having inner and outer surfaces and a layer of insulating material provided around at least a portion of the outer surfaces of the side panels for minimizing distortion of the freeze-cast substrate by controlling temperature gradients within the mold and slurry. The layer of insulating material can be fiberglass insulating material.

These and other aspects, objects, features and advantages of the present invention will be more clearly understood and appreciated from a review of the following detailed description of the preferred embodiments and appended claims, and by reference to the accompanying drawings.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

A method of the present invention generally comprises at least two basic steps: (a) introducing a slurry into a mold unit comprised of a mold contained within a casting receptacle, and (b) lowering the temperature of the slurry to freeze the slurry and form a freeze-cast substrate while controlling temperature gradients within the mold unit to minimize distortion in the freeze-cast substrate.

Figure 1:
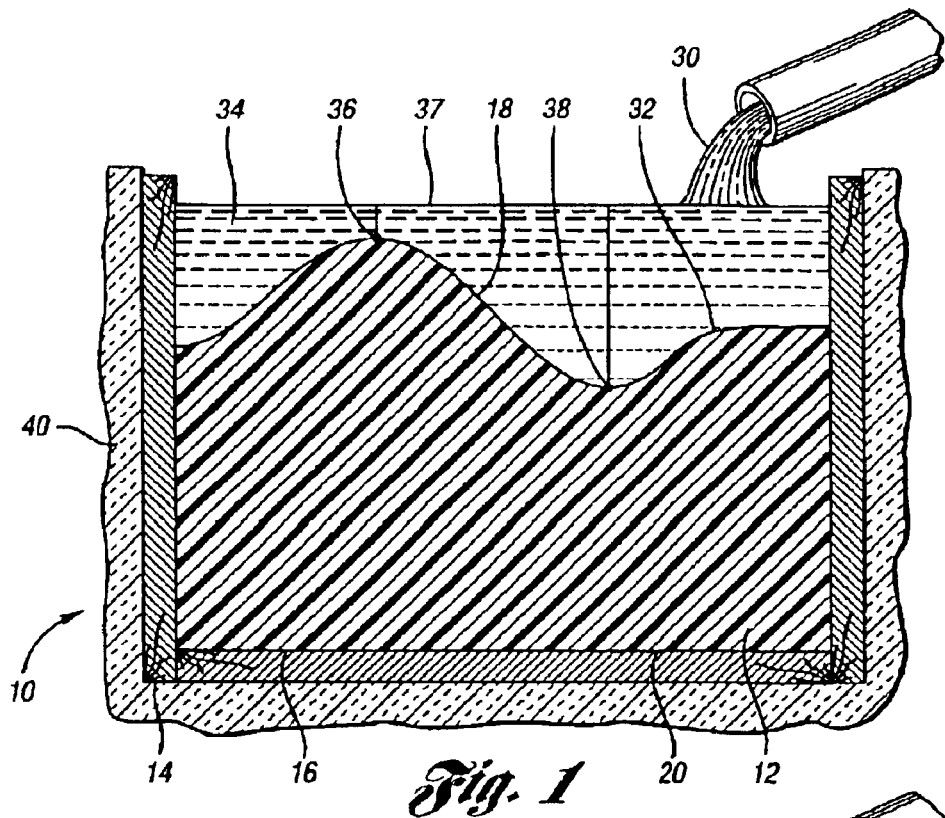
FIG. 1 is a schematic illustration of a preferred mold unit of the present invention used in a freeze-casting process of the present invention.

Referring to FIG. 1, mold unit 10 is comprised of mold 12 and substrate receptacle 14. Mold 12 contains a master pattern representative of the tool to be produced and is preferably constructed of polymeric material. The master pattern can be created using solid-free form fabrication techniques controlled by a CAD/CAM model. Free-formed fabrication can comprise stereolithography, cubital, laminated or foam object manufacturing, 3-D printing and stratified extrusion. Stereolithography is preferred since it creates a pattern directly from a vat of liquid photocurable polymer through selective solidification using a scanner laser beam. The master pattern can also be milled, or formed from wood, metal, laminate materials, and Ren board.

Mold 12 is defined in part by a base surface 16 and an upper surface 18. Mold 12 can be placed in substrate receptacle 14. Substrate receptacle 14 has receiving surface 20 which has essentially the same basic contour as base surface 16 of mold 12 for supporting mold 12. Substrate receptacle 14 can be constructed of four side panels and a bottom panel which contains receiving surface 20. The panels can be fastened together to form substrate receptacle 14 with a plurality of nails or other suitable fasteners.

Figure 2:
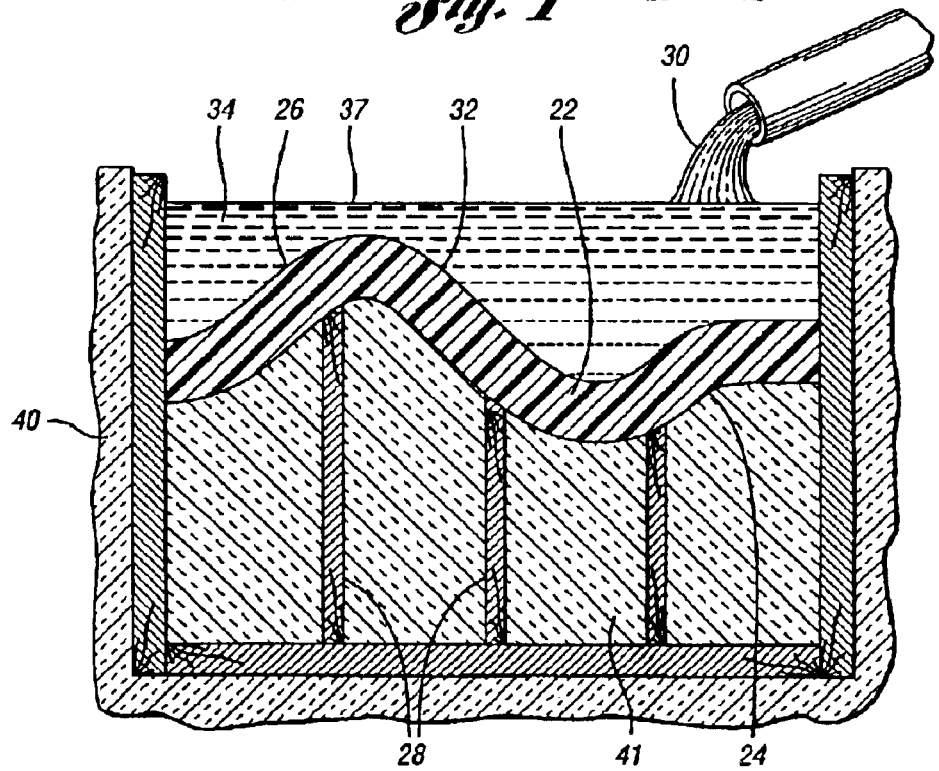
FIG. 2 is a schematic illustration of another preferred mold unit of the present invention used in a freeze-casting process of the present invention.

Referring to FIG. 2, an alternative mold 22 that can be constructed in accordance with the present invention is defined in part by contoured base surface 24 and upper surface 26 (which contains the master pattern). The shape of contoured base surface 24 can generally reflect the shape of upper surface 26. Ribs 28 can be fastened to a pair of opposing side panels of substrate receptacle 14 to receive contoured base surface 24 and support mold 22. Ribs 28 can be fastened to the pair of opposing side panels with nails or other suitable fasteners. Ribs 28 can be constructed of plywood, plastic, etc. Substrate receptacle 14 can be constructed without a bottom panel for use with mold 22 because ribs 28 function to sufficiently support mold 22 without receiving surface 20. It should be understood that the bottom panel can be used for additional support.

Referring to FIGS. 1 and 2, slurry 30 is introduced into the substrate receptacle 14 about the master pattern at room temperature. Preferably, slurry 30 is introduced by pouring. Slurry 30 can be made of any suitable ceramic known in the art. Examples of suitable ceramics include aluminum oxide or silica core sand. Suitable ceramics should provides an excellent surface finish, good thermal shock resistance at 1800–2400° F., a compressive strength of at least about 9000 psi, and low shrinkage along with low thermal expansion. Slurry 30 is preferably comprised of alumina and aqueous silica, otherwise referred to as silica sol. The alumina can act as a filler material. It should be understood that other filler materials can be used as long as they are thermally stable and do not react with the silica sol.

After introducing slurry 30 into substrate receptacle 14, slurry 30 is chilled (i.e., the temperature is lowered) to freeze it and form a freeze-cast substrate. A preferred process of chilling slurry 30 includes placing mold unit 10 in a chilling apparatus and setting the chilling apparatus to a chilling temperature to freeze slurry 30. The chilling apparatus is preferably an upright walk-in freezer. Any chilling apparatus capable of maintaining temperatures from about –30° C. to about 0° C. can be used to freeze slurry 30. Optionally, the chilling apparatus can include a temperature controller, preferably manufactured by Hanse Industries of Allegan, Mich. Slurry 30, after it freezes, forms the freeze-cast substrate which has a peripheral surface 32, which closely resembles the spraying pattern.

The freeze-cast substrate is then removed from substrate receptacle 14. A release agent, such as silicone or a wax is preferably applied to the upper surface of the mold and the inside of the casting receptacle before introducing slurry 30 to help facilitate the removal of the freeze-cast substrate 34 from the substrate receptacle 14 and the mold 12 or 22.

After the freeze-cast substrate is removed from the substrate receptacle 14, it is heated in a furnace to drive off any free liquid in the ceramic.

During the chilling of mold 12 or 22, temperature gradients develop within the mold and the slurry. As a non-limiting example, the chilling temperature can be set to about –30° C. When the chilling apparatus is initially set to the chilling temperature (time 0), the temperature of base surface 16 of mold 12 can be about 20° C. (i.e., room temperature), the temperature of first mold point 36 located about 2 inches below exposed surface 37 of slurry 30 on the upper surface 18 of mold 12 can be about 20° C. (i.e., room temperature), and the temperature of second mold point 38 located about 10 inches below exposed surface 37 of slurry 30 on the upper surface 18 of mold 12 can be about 20° C. (i.e., room temperature).

After the mold has been exposed to the chilling temperature for a period of time (time 1), the temperature of base surface 16 of mold 12 can be about –20° C. The temperature of first mold point 36 can be about –5° C. as heat escapes from first mold point 36 in order to reach the temperature of the surrounding frozen slurry. The temperature of second mold point 38 can be about 5° C. since heat escapes from second mold point 38 in order to reach the temperature of the surrounding chilled liquid slurry.

After the mold has been exposed to the chilling temperature for a period of time longer than time 1 (time 2), the temperature of base surface 16 of mold 12 can be about –30° C. The temperature of first mold point 36 can be about –5° C., i.e., the temperature of the frozen slurry surrounding first mold point 36. The temperature of the second mold point 38 can be about –5° C. since the slurry surrounding second mold point 38 can be frozen by time 2.

According to this example, a temperature gradient of 25° C. exists between second mold point 38 and base surface 16 at time. At time 2, a temperature gradient of 25° C. exists between first mold point 36 and base surface 16. Temperature gradients form between points in the slurry, as well. It has been discovered that these temperature gradients can cause thermal stresses within the mold and/or slurry. The stresses are relieved through movement and/or dimensional change within the mold and/or slurry, i.e., portions of the mold and/or slurry expand and/or contract. This expansion and/or contraction can cause warping and/or distortion of the upper surface of mold 12 or 22 which contains the master pattern of the tool to be produced. Consequently, the freeze-cast substrate can be warped and/or distorted, leading to imperfections in the tool produced by depositing metallic particles onto the freeze-cast substrate.

According to one embodiment of the present invention, the amount of distortion in the freeze-cast substrate can be minimized by controlling temperature gradients within the mold unit. By controlling temperature gradients, the thermal stresses areminimized, and, therefore, less warping andlor distortion occurs within the mold and/or the slurry. Depending on various operating parameters, i.e., mold size, mold composition, slurry composition, chilling temperature, temperature gradients of about 0° C. to about 25° C. can efficiently minimize the amount of distortion.

A preferred method of controlling temperature gradients includes providing insulation material 40 around the mold 12 or 22 by placing material 40 around mold unit 10. Examples of suitable insulating materials include fiberglass, cork, and rock wool. Preferably, the insulating material has a thermal conductivity of about 0.04 w/m K or less. Preferably, insulating material 40 is comprised of a fiberglass insulating material. For example, MIRAFLEX R-25, PINK R-13, or PINK R-19 fiberglass insulation available from Owen Corning of Toledo, Ohio, can be utilized. It should be understood that other insulating materials can be used as long as they effectively reduce the transfer of heat.

Insulating material can be placed around at least a portion of the side panels of substrate receptacle 14. Insulating material 40 can be stapled, nailed, taped, or glued to the four side panels. Insulating material 40 can also be leaned up against the side panels. Preferably, at least one layer of insulating material is secured to the external surfaces of the side panels with tape. Additionally, insulating material 40 can be placed beneath bottom surface of casting receptacle 14. The thickness of the insulating material is preferably about 2 inches to about 12 inches, and most preferably about 4 inches to about 6 inches (referring to uncompressed thickness with respect to bottom surface). The casting receptacle can be placed on a false bottom which can reduce compression of the insulating material placed beneath mold unit 10. In the case of mold 22, insulating material can be placed in cavities 41 between ribs 28.

Insulating material 40 reduces the transfer of heat from the side panels and/or the bottom surface of casting receptacle 14 and, therefore, reduces the formation of thermal stresses within the mold and slurry. Thermal stresses may form about exposed surface 41 since most of the heat within the mold and slurry will escape upward through this surface. However, any resulting distortion has minimal, if any, effect on the quality of the tool produced since the exposed surface does not receive the metallic coating (i.e., the exposed surface is the least critical surface).

Another method of controlling temperature gradients includes controlling the freezing rate (rate of lowering the temperature) of the mold unit. The freezing rate can be controlled by utilizing a temperature controller that controls the temperature of the chilling apparatus, i.e., set to achieve a specified ramp rate.

For example, lowering the temperature of the mold unit can be conducted in a two-stage process comprised of (1) a pre-chilling stage and (2) a hard-freeze stage. The controller temperature during the pre-chill stage can be between about 0° C. and about 3° C., and preferably about 2° C. The controller temperature during the hard-freeze stage can be between about −20° C. and about −50° C., and preferably about 40° C. The duration of stages (1) and (2) can depend on a number of variables, which include, but are not limited to, mold material, casting receptacle material, and mold size. To account for these variations, temperature readings (preferably made by thermocouples) during freezing can be used to determine the duration of stages (1) and (2). The temperature readings can be directly fed back to the temperature controller that controls the temperature within the chilling apparatus. At least one thermocouple can be placed in the mold, preferably at about the center point of one quadrant of the mold. At least one thermocouple can be placed in the slurry at mid-depth where the slurry is the deepest.

According to a preferred embodiment, the temperature controller can initially set the chilling apparatus to about 2° C. to begin the pre-chilling stage. The pre-chilling stage lasts until the at least two thermocouples indicate that this temperature has been reached at most locations within the slurry and mold. At this point, the temperature controller can set the chilling apparatus to −40° C. to begin the hard-freeze stage. When the slurry is hard and frozen, the hard-freeze stage can end and extraction of freeze-cast substrate can be accomplished.

It should be understood that an intermediate stage can be added for thermally difficult molds (i.e., molds with low thermal conductivities and/or high coefficients of thermal expansion) which have a tendency to distort. The intermediate stage begins once the at least two thermocouples indicate that the pre-chilling temperature has been reached at locations within the mold and slurry. The temperature of the chilling apparatus during the intermediate stage is preferably −8° C. The intermediate stage lasts until the at least two thermocouples indicate that this temperature has been reached at most locations within the mold and slurry.

Another method of controlling temperature gradients includes abruptly decreasing temperature of the chilling apparatus to a sub-chilling temperature to abruptly freeze slurry 30. Preferably, liquid nitrogen can be introduced into the freezing apparatus to set the chilling apparatus to the sub-chilling temperature. A preferred sub-chilling temperature is about −70° C. By rapidly decreasing the temperature of the chilling apparatus, the slurry chilling process is completed before temperature gradients or any internal stresses can form within the mold.

By way of another non-limiting example, liquid nitrogen can be poured directly onto the exposed slurry surface 37. After about one minute, the freeze-cast substrate, i.e., the frozen slurry, is removed from the mold and casting receptacle.

After the freeze-cast substrate is dried, metallic particles can be sprayed onto the freeze-cast substrate containing the spraying pattern using spray forming. It should be understood that spray forming can refer to any technique used to deposit metal particles upon a substrate, i.e., thermal spraying, and cold spraying. Spray forming techniques that can be used in accord with the present invention include, but are not limited to spray-rolling, spray-forging, centrifugal spray-casting, spray-casting, spray-peening, splat-coating, particle composite deposition, roller atomizing, modified arc spray, and modified plasma-spraying.

Figure 3:
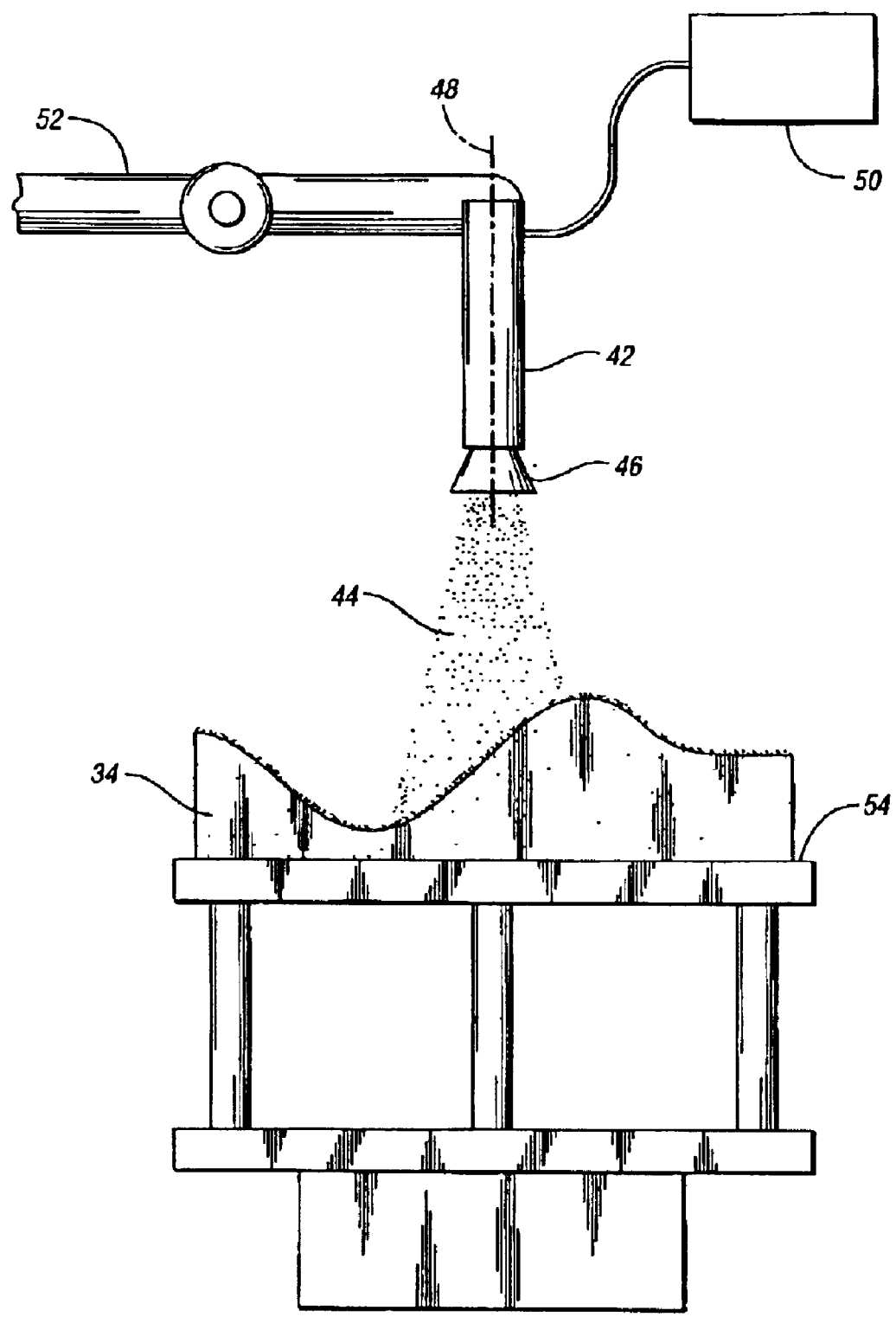
FIG. 3 is a schematic illustration of an apparatus used in a spray forming process of the present invention.

In accordance with a spray forming technique of the present invention, one or more thermal spray gun(s) 42, shown schematically in FIG. 3, are preferably utilized to spray metallic particles 44 onto the spraying pattern of freeze-cast substrate 36. The thermal spray gun 42 can be of the oxy-acetylene flame type in which a wire or powder metal is fed thereinto, a plasma-type into which powder metal is fed, or preferably one or two wire arc type, in which the tip of the wires is fed into the arc. Cold spraying guns capable of impact fusion could be used in place of thermal spray guns to spray metallic particles onto the freeze-cast substrate. In addition, high-energy plasma-spraying, vacuum plasma-spraying, detonation, and high-velocity oxyfuel techniques can be utilized.

In a two wire arc spray gun, an electric arc is generated in a zone between two consumable wire electrodes. As the electrodes melt, the arc is maintained by continuously feeding the electrodes into the arc zone. The metal at the electrode tips is atomized by a blast of generally cold compressed gas. The atomized metal is then propelled by the gas jet to a substrate forming a deposit thereon.

In a single wire arc apparatus, a single wire is fed either through the central axis. of the torch or is fed at an acute angle into a plasma stream that is generated internally within the torch. The single wire acts as a consumable electrode that is fed into the arc chamber. The arc is established between the cathode of the plasma torch and the single wire as an anode, thereby melting the tip of the wire. Gas is fed into the arc chamber, coaxially to the cathode, where it is expanded by the electric arc to cause a highly heated gas stream (carrying metal droplets from the electrode tip) to flow through the nozzle. A further higher temperature gas flow may be used to shroud or surround the spray of molten metal so that droplets are subjected to further atomization and acceleration.

Yet still other wire arc torch guns may be utilized that use a transferred-arc plasma whereby an initial arc is struck between a cathode and a nozzle surrounding the cathode. The plasma created from such arc is transferred to a secondary anode (outside the gun nozzle) in the form of a single or double wire feedstock, causing melting of the tip of such wire feedstock.

In a preferred embodiment as shown in FIG. 3, a thermal spray gun 42 has a gun tip 46 which is oriented along an axis 48 perpendicular to the general planar extent of the base of the freeze-case substrate. The thermal spray gun 42 has a power supply 50 operated at about 30 volts.

Thermal spray gun 42 is supplied with a high pressure gas from their respective supplies consisting of nitrogen, air, or a mixture thereof, at a pressure of about 40 to 120 psi, such gas being utilized to affect the atomization of the wire droplets.

The gun 42 may be moved robotically, such as by robots 52 and the freeze-cast substrate 36 may be mounted on a turntable 54 and rotated by a motor to achieve relative movement between the spray pattern of the guns and the spraying pattern. Repeated passes of the spray material will deposit a bulk deposit having a thickness of at least about 0.1 inches, and preferably between about 0.5 and about 2 inches on surface 26. The thermal spraying step preferably lasts for about three hours, and results in deposits 46 having a thickness of between about 0.5 to about 2.0 inches for deposits of about 2 feet by 2 feet. Larger sized deposits may require thicker sections and more passes.

While the best mode for carrying out the invention has been described in detail, those familiar with the art to which this invention relates will recognize various alternative designs and embodiments for practicing the invention as defined by the following claims.

What is claimed is:

1. A method for producing a freeze-cast substrate, the method comprising:
   (a) introducing a refractory slurry into a mold unit comprised of a mold contained within a casting receptacle, and
   (b) lowering the temperature of the refractory slurry to freeze the refractory slurry and form a freeze-cast substrate while controlling temperature gradients within the mold unit to minimize distortion in the freeze-cast substrate, wherein the lowering step includes placing an insulating material around at least a portion of the casting receptacle.

2. The method of claim 1, wherein the insulating material has a thermal conductivity of about 0.04 w/m K or less.

3. The method of claim 1, wherein the insulating material is comprised of a fiberglass insulating material.

4. The method of claim 1 wherein the lowering step is comprised of controlling the rate at which the temperature is lowered to minimize temperature gradients in the mold unit.

5. The method of claim 1 wherein the lowering step includes abruptly decreasing the temperature of the mold unit from room temperature to a sub-chilling temperature.

6. The method of claim 1 wherein a chilling apparatus is provided for the lowering step.

7. The method of claim 6 wherein the chilling apparatus is comprised of a freezer.

8. The method of claim 6 wherein the chilling apparatus includes a temperature controller for adjusting the temperature within the chilling apparatus.

9. The method of claim 1 wherein metallic particles are sprayed onto the freeze-cast substrate.

10. The method of claim 9 wherein the metallic particles are sprayed onto the freeze-cast substrate by a spray forming technique.

11. The method of claim 10 wherein the spray forming technique is selected from the group consisting of cold spraying, flame powder, flame wire, arc-spraying, plasma-spraying, high-energy plasma-spraying, vacuum plasma-spraying detonation, and high-velocity oxyfuel.

12. A method for producing a freeze-cast substrate, the method comprising:
   (a) introducing a refractory slurry into a mold unit comprised of a mold contained within a casting receptacle;
   (b) placing insulation material around at least a portion of the casting receptacle to minimize distortion in the freeze-cast substrate by controlling temperature gradients within the mold unit; and
   (c) lowering the temperature of the refractory slurry to freeze the slurry to form a freeze-cast substrate.

13. The method of claim 12 wherein the insulating material has a thermal conductivity of about 0.04 w/m K or less.

14. The method of claim 12 wherein a chilling apparatus is provided for the lowering step.

15. The method of claim 14 wherein the chilling apparatus is comprised of a freezer.

16. The method of claim 15 wherein the chilling apparatus includes a temperature controller for adjusting the temperature within the chilling apparatus.

17. A mold unit for producing a freeze-cast substrate from a refractory slurry, the mold unit comprising:
   (a) a mold;
   (b) a substrate receptacle having a base panel and four interconnected side panels being substantially perpendicular to and connected with the base panel, the base panel having a receiving surface for receiving the mold, and each side panel having an inner and outer surface, and
   (c) a layer of insulating material provided around at least a portion of the outer surfaces of the side panels for minimizing distortion in the freeze-cast substrate by controlling temperature gradients within the mold and the refractory slurry.

18. The mold unit of claim 17 wherein the insulating material has a thermal conductivity of about 0.04 w/m K or less.

19. The mold unit of claim 17 wherein the layer of insulting material is comprised of a fiberglass insulating material.

* * * * *